United States Patent
Strand et al.

(10) Patent No.: US 10,592,262 B1
(45) Date of Patent: Mar. 17, 2020

(54) MANAGING SHARED COMPUTING ENVIRONMENTS

(75) Inventors: William Alexander Strand, Issaquah, WA (US); David C. Yanacek, Seattle, WA (US)

(73) Assignee: Amazon Technologies, INC., Seattle, WA (US)

( * ) Notice: Subject to any disclaimer, the term of this patent is extended or adjusted under 35 U.S.C. 154(b) by 668 days.

(21) Appl. No.: 13/170,087

(22) Filed: Jun. 27, 2011

(51) Int. Cl.
G06F 9/455 (2018.01)

(52) U.S. Cl.
CPC .......... *G06F 9/455* (2013.01); *G06F 9/45533* (2013.01)

(58) Field of Classification Search
CPC ... G06F 9/455; G06F 9/45533; G06F 9/45562
USPC .......................................................... 705/50
See application file for complete search history.

(56) References Cited

U.S. PATENT DOCUMENTS

| | | | |
|---|---|---|---|
| 6,170,012 B1 | 1/2001 | Coss et al. | 709/229 |
| 6,408,336 B1 | 6/2002 | Schneider et al. | 709/229 |
| 6,411,967 B1 | 6/2002 | Van Renesse | 707/201 |
| 6,529,953 B1 | 3/2003 | Van Renesse | 709/223 |
| 6,724,770 B1 | 4/2004 | Van Renesse | 370/432 |
| 7,316,000 B2 | 1/2008 | Poole et al. | 717/104 |
| 7,953,865 B1 * | 5/2011 | Miller | H04L 12/6418 709/227 |
| 8,656,018 B1 * | 2/2014 | Keagy | G06F 8/63 709/226 |
| 8,881,142 B1 * | 11/2014 | Reid | G06F 9/485 718/1 |

(Continued)

FOREIGN PATENT DOCUMENTS

| | | | | |
|---|---|---|---|---|
| WO | WO2011/088349 A2 * | 7/2011 | | |
| WO | WO2012/027478 A1 * | 3/2012 | ............... | G06F 9/46 |

OTHER PUBLICATIONS

"Grid Computing Solutions," Sun Microsystems, Inc., retrieved May 3, 2006, from http://www.sun.com/software/grid, 3 pages.

(Continued)

*Primary Examiner* — James D Nigh
(74) *Attorney, Agent, or Firm* — Knobbe, Martens, Olson & Bear, LLP

(57) ABSTRACT

Techniques are described for automatically managing shared computing environments, such as a shared computing environment made available by a provider entity for simultaneous use by multiple third-party clients in exchange for fees. The functionality provided by a shared computing environment may have various forms, including in some situations to enable a client to execute a client-provided software program within the shared computing environment. The managing of shared computing environments may include performing various automated operations, including monitoring operational performance of particular shared computing environments and the use of shared computing environments by particular clients, and using information from the monitoring to provide additional functionality to the clients and/or to the providers of the shared computing environments. The providing of shared computing environments may in some situations be performed by an automated program execution service that manages execution of various programs for various users of the program execution service.

25 Claims, 7 Drawing Sheets

(56) References Cited

U.S. PATENT DOCUMENTS

| | | | | |
|---|---|---|---|---|
| 8,984,505 | B2* | 3/2015 | Ferris | G06F 9/5027 |
| | | | | 718/1 |
| 9,122,536 | B2* | 9/2015 | Kelkar | G06F 9/5072 |
| 9,130,912 | B2* | 9/2015 | Agrawal | G06F 9/45558 |
| 9,311,162 | B2* | 4/2016 | DeHaan | G06F 9/5077 |
| 9,424,094 | B2* | 8/2016 | Cardosa | G06F 9/5044 |
| 9,462,056 | B1* | 10/2016 | Protopopov | H04L 67/2838 |
| 2002/0112076 | A1 | 8/2002 | Rueda et al. | 709/245 |
| 2002/0122420 | A1 | 9/2002 | Yuan et al. | 370/389 |
| 2003/0041311 | A1 | 2/2003 | Poole et al. | 717/100 |
| 2004/0010572 | A1 | 1/2004 | Watanabe | 709/220 |
| 2004/0165588 | A1 | 8/2004 | Pandya | 370/389 |
| 2007/0169120 | A1 | 7/2007 | Schoenberg et al. | 718/1 |
| 2009/0276771 | A1* | 11/2009 | Nickolov | G06F 9/4856 |
| | | | | 717/177 |
| 2011/0016214 | A1* | 1/2011 | Jackson | G06F 9/5044 |
| | | | | 709/226 |
| 2011/0029672 | A1* | 2/2011 | Agneeswaran | G06F 9/5044 |
| | | | | 709/226 |

OTHER PUBLICATIONS

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved May 3, 2006, from http://www.eweek.com/article2/0,1895,1772626,00.asp, 5 pages.

"Scalable Trust of Next Generation Management (STRONG-MAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Coulson, D., "Network Security Iptables," Mar. 2003, Linuxpro, Part 1, retrieved from http://davidcoulson.net/writing/lxf/38/iptables.pdf, 4 pages.

Coulson, D., "Network Security Iptables," Apr. 2003, Linuxpro, Part 2, retrieved from http://davidcoulson.net/writing/lxf/39/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

"Global Server Load Balancing with ServerIron," Foundry Networks, retrieved Aug. 30, 2007, from http://www.foundrynet.com/pdf/an-global-server-load-bal.pdf, 7 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

"Go Daddy Hosting Connection—One-Click Hosting Applications," retrieved on May 26, 2011, from http://hostingconnection.godaddy.com/Home.aspx, 2 pages.

"Free Connections Resource for Hosting Software and Support," retrieved on May 3, 2011, from http://www.godaddy.com/hosting/metropolis.aspx?ci=9017, 2 pages.

"Web Hosting—Secure Hosting Plans with Unlimited Bandwidth," retrieved on May 26, 2011, from http://www.godaddy.com/hosting/web-hosting.aspx?ci=8971, 4 pages.

"Web Hosting—Secure Hosting Plans with Unlimited Bandwidth," retrieved on May 3, 2011, from http://www.godaddy.com/hosting/web-hosting.aspx?ci=21391, 2 pages.

"Virtual Dedicated Servers—Highly Configurable Plans Low Prices," retrieved on May 3, 2011, from http://www.godaddy.com/hosting/virtual-dedicated-servers.aspx?ci=9013, 2 pages.

* cited by examiner

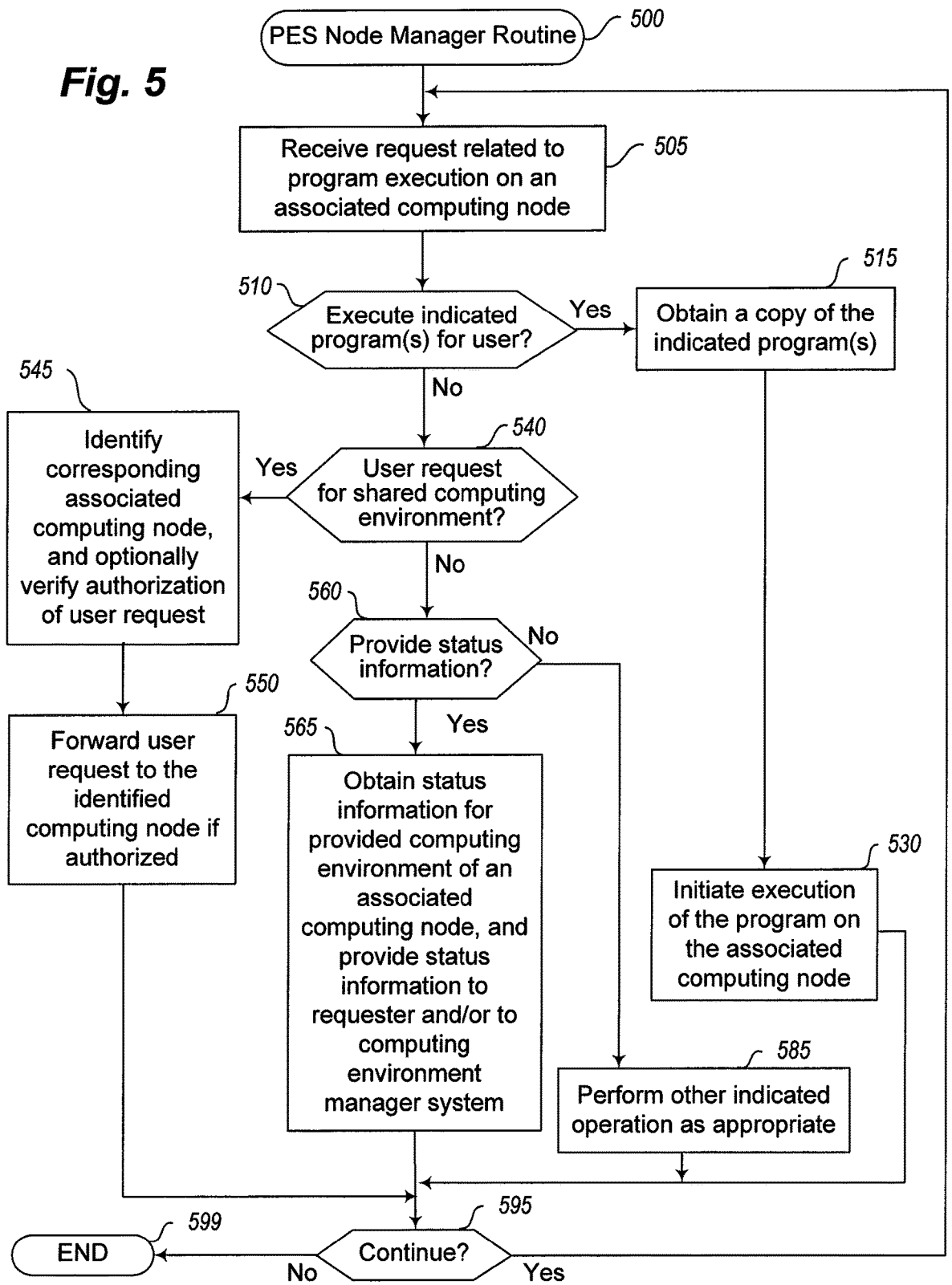

MANAGING SHARED COMPUTING ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of co-located interconnected computing systems have become commonplace, such as private data centers that are operated by and on behalf of a single organization, and public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by XEN, VMWare, or User-Mode Linux may allow a single physical computing system to be shared among multiple users by providing each user with one or more virtual machines hosted by the single physical computing system, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIG. 5 is a flow diagram of an example embodiment of a PES Node Manager routine for a program execution service.

DETAILED DESCRIPTION

Figure 1:
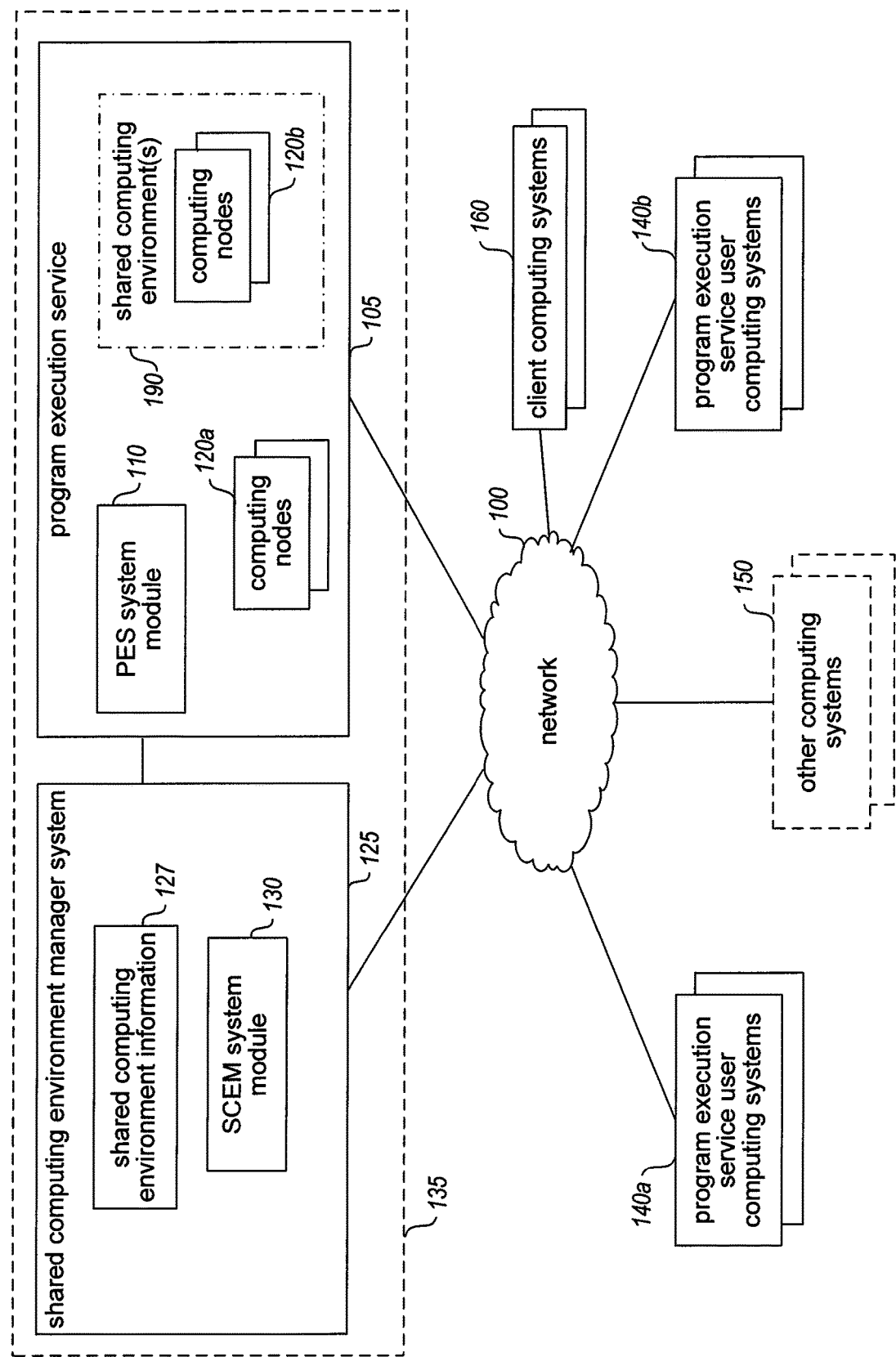
FIG. 1 is a network diagram illustrating an example embodiment of interactions to manage the providing and use of shared computing environments.

Techniques are described for automatically managing the providing and use of target computing environments, such as for a shared computing environment that is made available by a provider entity for simultaneous use by multiple third-party clients in exchange for fees from those clients. Such target computing environments may each use a group of one or more computing systems that are configured to provide one or more specified types of functionality to clients, such as by executing one or more programs for use in providing those specified functionality types. The types of functionality that may be provided by a target computing environment may have various forms in various embodiments, as discussed in greater detail below, including in some embodiments to enable clients to each execute a software program provided by the client within the target computing environment, such as with the executing client program using functionality provided by one or more other software programs that are executing as part of the target computing environment. The managing of the providing and use of target computing environments may include performing various types of automated operations, as discussed in greater detail below, including in some embodiments to monitor the operational performance of particular target computing environments and of the use of target computing environments by particular clients, and to use information from the monitoring to provide additional automated functionality to the clients and/or to the providers who operate the target computing environments. In at least some embodiments, some or all of the described techniques include automated operations of a shared computing environment manager system, as discussed in greater detail below.

In addition, the providing of target computing environments may in at least some embodiments be performed by an automated program execution service that manages execution of various programs for various users of the program execution service. In such embodiments, the users of the program execution service may each pay one or more types of fees to the program execution service for the functionality provided by the program execution service (e.g., a specified fee for a specified amount of computing resources that are provided for a specified amount of time). For example, an entity that desires to provide a particular target computing environment for use by one or more other clients may register as a customer of the program execution service, or otherwise act as a user of the program execution service to initiate the execution of one or more specified programs on one or more computing nodes provided by the program execution service—the operation of that group of one or more configured computing nodes may then provide a target computing environment for use by the other client(s), such as by receiving programmatic requests from clients for one or more types of functionality available from the target computing environment and by responding to those programmatic requests by providing corresponding functionality from the shared computing environment. In such situations, the user of the program execution service who provides the target computing environment may thus pay one or more types of fees to the program execution service for the functionality provided by the program execution service to support the target computing environment.

In addition, the client(s) of a target computing environment (who in some embodiments may also be other users of the program execution service) may provide fees to the provider user who provides the target computing environment, with corresponding fee collection and distribution services optionally being performed by the program execution service (e.g., in exchange for a portion of the fees collected from clients, or instead using an alternative fee arrangement) if the target computing environment is provided by using functionality of the program execution service. In some such embodiments in which target computing environments are provided using one or more program execution services, the target computing environment manager system may operate as part of the functionality provided by a particular program execution service, or may instead in other such embodiments be operated by a first operator entity as an independent system that interacts with one or more other program execution services operated by other second operator entities. In addition, in at least some embodiments, the target computing environments being provided are each a shared computing environment that is available for use by multiple other clients (e.g., simultaneously, such as to provide a fractional share of the shared computing environment's resources to each of the other clients).

FIG. 1 is a network diagram that illustrates an example of an automated system 105 that provides a program execution service that manages execution of software programs for users on various available computing nodes, including to use some computing nodes on behalf of provider users to provide shared computing environments that are available to other clients. FIG. 1 further illustrates an example of a shared computing environment manager system 125 that manages shared computing environments (not separately shown) being provided by provider users or other provider entities, including in the illustrated embodiment to manage one or more shared computing environments being provided by provider users of the program execution service system 105. In the illustrated embodiment, the program execution service system 105 and the shared computing environment manager system 125 are integrated together into a single system 135 (e.g., provided by a single entity, not shown), but in other embodiments may have other forms (e.g., being separate systems operated by separate entities, optionally with multiple program execution service systems interacting with one or more shared computing environment manager systems and/or optionally with multiple shared computing environment manager systems interacting with one or more program execution service systems; being in the form of a single system that includes at least some of the described functionality of both the program execution service and the shared computing environment manager system; etc.).

In the example of FIG. 1, various users 140 of the program execution service 105 may access the program execution service to obtain various functionality provided by the program execution service. In particular, in this example embodiment, a first group of users (not shown) are using various computing systems 140a to interact over the network 100 with the program execution service system 105, which is provided by one or more programmed or otherwise configured computing systems (not shown). The users of the computing systems 140a in this example interact with the program execution service to request the program execution service to execute programs on their own behalf, with the program execution service selecting various computing nodes 120a on which to execute those users' programs. In addition, in this example embodiment, a second group of one or more users (not shown) are using computing systems 140b to interact over the network 100 with the program execution service system 105 to each request the program execution service to execute one or more programs on one or more computing nodes to provide a shared computing environment 190 available for use by others, with the program execution service selecting various computing nodes 120b on which to execute those users' programs and provide those one or more shared computing environments. Furthermore, a third group of client users (not shown) are using various computing systems 160 to each interact over the network 100 with one or more particular shared computing environments 190 being provided by the computing nodes 120b of the program execution service system 105, with some or all of the client users optionally also being registered users of the program execution service. More generally, it will be appreciated that the users of computing systems 140a, 140b and 160 may overlap in various manners, such that a given user may, for example, be using his/her computing system to act as a system 140a in executing a first program on the user's own behalf, be using his/her computing system to act as a system 140b in using the program execution service to provide a first shared computing environment for use by other clients, and/or be using his/her computing system to act as a system 160 in being a client of a second shared computing environment that is provided via the program execution service by another provider user.

The shared computing environments 190 may each provide one or more indicated types of functionality for use by clients, including by each executing one or more programs within the shared computing environment. Non-exclusive examples of types of functionality that may be provided within a shared computing environment include the following: to execute a database management software system (e.g., MySQL, PostgreSQL, etc.) to enable clients to access functionality of the database management system; to execute a Web server software system (e.g., Apache, lighttpd, nginx and/or mongrel, etc.) to enable clients to access functionality of the Web server system; to execute a scripting language software system (e.g., PHP and/or Perl, optionally in combination with the Apache HTTP server software or other Web server software; etc.) to enable clients to access functionality of the scripting language system, including to execute client-supplied scripting programs and/or to use client-supplied information within the scripting language system, optionally in combination with provided Web server software; to execute an application framework software system or other software execution environment for use with one or more programming languages (e.g., the Ruby on Rails application framework for the Ruby programming language, such as via the Phusion Passenger software system, optionally in combination with Apache or nginx; the Apache Tomcat Java servlet container for use with Java Servlet and Java ServerPages; etc.) to enable clients to access corresponding functionality, including to execute client-supplied programs in the programming language(s) or to otherwise use client-supplied information within the application framework or execution environment; to execute combinations of multiple software programs (e.g., the LAMP software bundle including Linux, Apache, MySQL and Perl/PHP/Python; the Tomcat; etc.); etc. Thus, as one non-limiting example, a client who provides a Web site and has occasional PHP calls (based on other users accessing the Web site) may desire to use a shared computing environment that includes functionality to execute those PHP calls if they are sent to the shared computing environment by the Web site (e.g., by redirecting the end users to access that functionality from the shared computing environment, by directing interacting with the shared computing environment to access that functionality and then responding back to the end users, etc.), but with an average need of only a fraction (e.g., less than 1%, 1%, less than 5%, less than 25%, less than 50%, over 50%, etc.) of a dedicated computing node providing such functionality.

At least some of the functionality of the program execution service is provided in this example by a PES ("program execution service") system module 110 of the program execution service system 105, and other related functionality may optionally be provided by other modules (not shown) of the program execution service. In particular, the system module 110 performs automated operations to manage activities of the program execution service, and the various users interact with the module 110 in order to request execution of programs, including programs used to support the shared computing environments 190. In some embodiments, a user of the program execution service may designate a software program to be executed that is provided by the program execution service, while in other embodiments the user may supply one or more programs to be executed. As part of preparing a software program for execution, the module 110 may, for example, enable particular users to specify quantities of computing nodes to be used in the execution of a software program and/or to specify particular portions of the software program (e.g., particular objects, modules, or functions within the software program) to be executed together with or separate from other such software program portions, although in other embodiments the program execution service may instead automatically determine some or all such information without such user input.

In this example, the shared computing environment manager system 125 performs automated operations to manage the providing and use of one or more shared computing environments 190 via the program execution service, including to perform interactions with one or more of the program execution service system 105, the provider users of the computing systems 140, and the client users of client computing systems 160 in order. In other embodiments, the shared computing environment manager system 125 may manage the provision and use of one or more shared computing environments (not shown) that are provided in manners other than via the program execution service 105 (e.g., by one or more of the optional other computing systems 150), whether instead of or in addition to the shared computing environments 190 provided via the program execution service. Furthermore, in some embodiments, the shared computing environments 190 provided via the program execution service may include a first group of one or more shared computing environments that are provided on behalf of provider users of the computing systems 140*b*, and also include one or more other shared computing environments that are provided by an operator of the program execution service on its own behalf for use by clients.

At least some of the functionality of the shared computing environment manager system 125 is provided in this example by a system module 130 of the shared computing environment manager system 125, and other related functionality may optionally be provided by other modules (not shown) of the shared computing environment manager system. In particular, the system module 130 performs automated operations to manage activities of the shared computing environment manager system, including to obtain and use information 127 about the shared computing environments 190. For example, when a provider user of a computing system 140*b* interacts with the program execution service to create (or modify) a particular shared computing environment 190, the program execution service may perform interactions with the shared computing environment manager system to notify the shared computing environment manager system of the existence of the shared computing environment and optionally of additional information associated with the shared computing environment (e.g., an identity of the provider user; one or more types of functionality provided by shared computing environment, such as based in part or in all on one or more programs that are executed as part of providing the shared computing environment; one or more fees charged by the provider user to clients for use of the shared computing environment; one or more types of APIs provided by the shared computing environment for clients to use; etc.). In addition, such a provider user may directly interact with the shared computing environment manager system 125 to provide some or all such information, whether instead of or in addition to the program execution service, including to provide information about shared computing environments that are not provided via such a program execution service.

In addition to information about the existence and associated attributes of shared computing environments, the shared computing environment manager system 125 may further obtain information about the operating performance of a shared computing environment (e.g., with respect to stability and/or performance), such as may be measured with respect to one or more defined performance metrics. Non-exclusive examples of such performance metrics include availability/uptime statistics, latency rates in responding to client requests, error rates in responding to client requests, aggregate client-provided review scores or other assessments, measurements of how quickly a shared computing environment upgrades to new versions of the software programs that it uses, measurements specific to a type of functionality being provided (e.g., with respect to a particular programming language or software execution environment for executing client-supplied software programs), etc. Since some or all such performance metrics for a shared computing environment may be affected by the provider user who provides the shared computing environment (e.g., based on choices made to create and configure the computing nodes providing the shared computing environment, such as a quantity and type of computing nodes used, a type and version of software programs used, etc.; based on management of ongoing operations of particular computing nodes providing the shared computing environment; etc.), the tracking of such operational performance information enables clients to assess and choose between alternative shared computing environments providing the same or overlapping types of functionality. Such information may be obtained by the shared computing environment manager system 125 in various manners in various embodiments, including by obtaining the information from a program execution service for a shared computing environment provided via the program execution service based on monitoring performed by the program execution service (whether in a push manner initiated by the program execution service, such as periodically or in response to particular events, or in a pull manner based on requests from the shared computing environment manager system), by obtaining information from clients of the shared computing environment, and/or by interacting directly with the shared computing environment to monitor and assess aspects of its performance (e.g., by acting as a client of the shared computing environment).

The shared computing environment manager system 125 may further assess and/or otherwise use the information that it obtains about particular shared computing environments. In some embodiments, potential clients of a shared computing environment may contact the shared computing environment manager system 125 to obtain information about possible shared computing environments, such as one or more shared computing environments that satisfy one or more criteria specified by the client (e.g., one or more types of functionality, a particular cost based on fees that are charged, particular operational performance information, etc.). Furthermore, in some embodiments, a potential client may supply a monetary bid (optionally along with other required criteria), and the shared computing environment manager system 125 may further provide information to the client of zero or more shared computing environments that satisfy the bid (e.g., by automatically selecting a preferred shared computing environment that satisfies the bid, such as a shared computing environment that satisfies any required criteria and has the lowest associated fee below the monetary bid, including to optionally initiate or otherwise direct interactions between the client and preferred shared computing environment; by identifying and optionally ranking multiple shared computing environments that satisfy the monetary bid and any required criteria, and providing corresponding information to the client; etc.).

The shared computing environment manager system 125 may further perform other operations in some embodiments and situations, such as to determine a particular shared computing environment that is preferred among multiple alternative shared computing environments for a client (e.g., multiple alternatives that all provide an indicated type of functionality being used by the client) based on ongoing performance (e.g., based on the client's usage patterns, based on the operational performance of the shared computing environments, etc.), including to optionally automatically switch a client from a non-preferred alternative environment to a preferred alternative embodiment in at least some situations. In addition, in some embodiments, such as when the shared computing environment manager system 125 is part of or otherwise affiliated with a particular program execution service, the shared computing environment manager system 125 may further perform automated operations corresponding to a client's use of a shared computing environment versus other functionality available from the program execution service, including to optionally switch in appropriate situations a client between use of a shared computing environment and use of one or more computing nodes of the program execution service that are dedicated to that client's use in a non-shared manner. For example, depending on a client's usage (e.g., volume of requests, access patterns, type of functionality used, etc.) and types of fees charged by a provider of a shared computing environment, a dedicated computing node may cost less and/or provide better performance with respect to one or more performance metrics. The shared computing environment manager system 125 may further perform other operations as well in some embodiments, such as to enforce one or more defined standards for some or all shared computing environments (e.g., a standard corresponding to a particular type of functionality, such as for shared computing environments that provide that type of functionality; a standard that is not specific to a type of functionality being provided, such as availability/uptime; etc.).

As previously noted, the program execution service makes various computing nodes 120 available for executing software programs in this example, although in other embodiments at least some of the computing nodes used for such execution may be provided in other manners (e.g., made available by the users of the client systems 140 or by other users on whose behalf execution of a software program is performed; made available by other third-party entities, such as via optional external computing systems 150; etc.). As discussed below, in at least some embodiments, some or all of the computing nodes used to execute software programs for the program execution service may each be a virtual machine hosted on a physical computer system, and the program execution service may incorporate a node manager module in an executing hypervisor program for the physical computer system to manage execution of the software programs. In addition, one or more modules of the program execution service may assist in continuously or repeatedly monitoring a computing node that is in use executing a software program, whether an associated PES node manager module or other PES module, including to determine amounts of use to enable fees to be determined for client use of a shared computing environment, as well as to optionally monitor and provide information about operational performance of computing nodes used to provide shared computing environments.

The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users, such as if the systems 105 and/or 125 are provided to support users of that private network. In still other embodiments, the network 100 may include one or more private networks with access to and/or from the Internet. In the illustrated embodiment, the modules 110 and 130 (and any other modules, not shown) may each include software instructions that execute on one or more computing systems (not shown) to program or otherwise configure those computing systems to perform some or all of the described techniques, and the systems that include those modules similarly may include those software instructions and optionally other software instructions. In addition, the modules and the computing nodes 120 may be provided in various manners, such as at a single data center or otherwise to use a group of co-located computing systems, or instead in a distributed manner using various computing systems in various distinct geographical locations.

In some embodiments, the illustrated computing nodes 120 may include multiple physical computing systems and/or multiple virtual machines that are hosted on one or more physical computing systems. Each of the computing nodes 120 has some amount of computing resources available for executing one or more programs, which provide a specific amount of program execution capacity, such as may be measured, for example, by a quantity of one or more such computing nodes and/or by a combination of one or more of processing capacity (e.g., number and/or size of processing units), memory capacity, storage capacity, network bandwidth capacity, etc. In some embodiments, preconfigured computing nodes may be used, with each preconfigured computing node having equivalent or otherwise similar amounts of resources available for executing programs on behalf of users, while in other embodiments, a selection of various different computing nodes having varying amounts and/or types of computing resources (e.g., size, speed and/or type of processing units; number of processing units; amount of memory and/or storage; platform configuration, such as 32-bit or 64-bit; etc.) may instead be used. Furthermore, when computing nodes vary based on geographical location and/or other characteristics, particular computing nodes may be chosen and used to execute a particular software program for various reasons.

After a request is received from a user to execute a software program, the module 110 may determine whether there are a sufficient number of computing nodes 120 with available resources for satisfying the request, and if so, the module 110 may initiate execution of the software program on an appropriate quantity of one or more of the computing nodes on behalf of the user. In some embodiments and situations, the program execution service will select one or more particular computing nodes for the execution of a software program, including to satisfy any specified conditions (e.g., conditions related to geographical locations of the computing nodes). The managing of the execution of the software program on one or more computing nodes may also include automated operations by the program execution service to prepare those computing nodes, including to provision each of the computing nodes appropriately (e.g., to load at least a portion of the software program on each computing node), as well as to initiate execution on each of the computing nodes of the portion of the software program that is loaded on the computing node. In at least some embodiments, the program execution service manages the entire execution lifecycle of the software program, including to shutdown or release the use of computing nodes after execution has completed on those computing nodes, to optionally temporarily pause the execution of particular software on particular computing nodes (e.g., while waiting for data or for other reasons), to optionally monitor the execution on each computing node, and to optionally restart or replace computing nodes that fail or otherwise become unavailable before their software execution is complete. Furthermore, in some embodiments the program execution service may perform automated operations to dynamically scale a group of computing nodes up or down in accordance with defined criteria, including a group of one or more computing nodes being used to provide a shared computing environment.

In addition, in some embodiments, one or more entities (e.g., a provider of a shared computing environment, a program execution service via which that shared computing environment is provided, the shared computing environment manager system, etc.) may take additional actions to determine one or more fees to charge a client for using the shared computing environment, and optionally obtain payment from the client for those fees, whether before or after the use occurs. For example, a client may be charged various fees to use a shared computing environment, such as based on a number of use requests that are made, a duration of time of use, particular operations that the shared computing environment performs (e.g., data transfer and/or storage, execution of particular client-supplied programs, etc.), particular features or functionality of the shared computing environment that are used (e.g., premium functionality having an associated fee separate from one or more other fees for accessing other functionality of the shared computing environment), etc.

The program execution service may perform various operations to further manage the execution of programs for users, including the provision and use of shared computing environments that are accessible to clients. For example, in at least some embodiments, the program execution service uses various physical computer systems that each host one or more virtual machines, with each of the virtual machines being treated as a distinct computing node by the program execution service that is configurable to execute one or more software programs for a particular user of the program execution service. The described techniques include the program execution service providing for each of its computing nodes an associated node manager module that monitors operations of the computing node, including to determine whether executing software on an associated computing node is authorized to provide one or more types of functionality. In at least some embodiments in which a computing node is a virtual machine hosted on a physical computer system, the node manager module may be implemented as part of a hypervisor program executing on the physical computer system to manage operations of the physical computer system's hosted virtual machine. In other embodiments, a single physical computer system may be used as a computing node, with a corresponding node manager module executing on that physical computer system or an associated device. In at least some such embodiments, an operator of a program execution service, a provider user of the program execution service who uses computing nodes of the program execution service to provide a shared computing environment, and a client user who accesses and uses functionality of the provided shared computing environment may all be distinct entities that are unaffiliated with each other except for the respective commercial transactions involving two or more of the entities. Additional details related to examples of functionality of a program execution service are included in U.S. patent application Ser. No. 12/686,273, filed Jan. 12, 2010 and entitled "Managing Private Use Of Program Execution Capacity," and in U.S. patent application Ser. No. 12/950,630, filed Nov. 19, 2010 and entitled "Predictive Governing Of Dynamic Modification Of Program Execution Capacity," each of which is hereby incorporated by reference in its entirety.

Although the foregoing example embodiment of FIG. 1 is described with respect to a program execution service that provides various types of functionality for various users in conjunction with an associated shared computing environment manager system, it will be appreciated that various other embodiments may exist. For example, in at least some embodiments and situations, some users or other entities may serve multiple roles. For example, a user of a client computing system 140 may also act as a provider of one or more shared computing environments that are available for use by others. As another example, in some embodiments, the entity providing the shared computing environment manager system and/or program execution service may also create and provide one or more shared computing environments. In addition, some of the clients or other users may represent an organization or other group (e.g., a company) instead of an individual.

Figure 2:
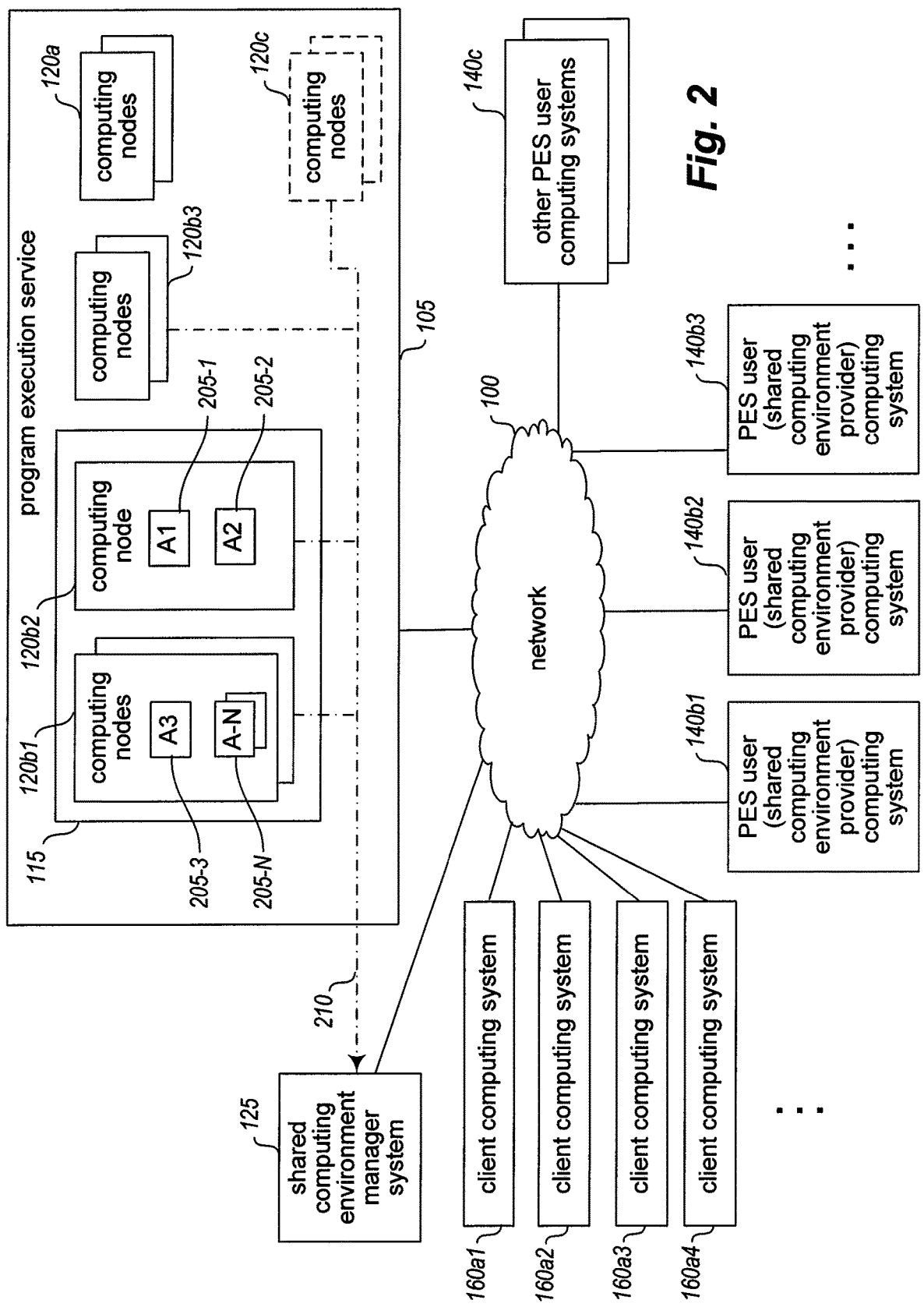
FIG. 2 illustrates examples of managing the providing and use of shared computing environments.

FIG. 2 illustrates examples of managing use of shared computing environments. The illustrated non-limiting examples illustrate various configured computing nodes of the program execution service system 105 of FIG. 1 and interactions between the program execution service system 105 and the shared computing environment manager system 125 of FIG. 1.

In other embodiments, a shared computing environment manager system may manage one or more shared computing environments that are provided externally to any program execution service (e.g., by a provider entity using one or more computers systems operated by the provider entity), and/or a particular program execution service may provide functionality of a shared computing environment manager system for shared computing environments that are provided by provider users of that program execution service. In addition, for illustrative purposes, some examples and embodiments are described below in which specific types of shared computing environments are provided, used and managed in specific manners. For example, particular clients may access particular shared computing environments in particular manners in particular embodiments, such as by having a remote executing program of a client make a programmatic request to an executing program that is part of a shared computing environment, while in other embodiments other types of interactions between clients and shared computing environments may occur. In addition, particular clients may access particular types of functionality from particular shared computing environments in particular embodiments, including in some situations to execute client-supplied programs (e.g., a script program, an applet program, etc.) within a shared computing environment and/or to have processing provided by a shared computing environment be performed on client-supplied data, although in other embodiments other types of functionality may be accessed. These examples are provided for illustrative purposes and are simplified for the sake of brevity, and it will be appreciated that the inventive techniques may be used in a wide variety of other situations, only some of which are described below.

In particular, in the example of FIG. 2, three provider users 140*b* of the program execution service 105 each interact with the program execution service over the network 100 to create and provide a shared computing environment, and optionally to perform modifications to their provided shared computing environments over time. In particular, provider user 140*b*1 initiates creation of a first shared computing environment (not shown separately) using multiple computing nodes 120*b*1, provider user 140*b*2 initiates creation of a second shared computing environment (not shown separately) using a single computing node 120*b*2, and provider user 140*b*3 initiates creation of a third shared computing environment (not shown separately) using multiple computing nodes 120*b*3. To initiate the creation of the first shared computing environment, provider user 140*b*1 may, for example, request that the program execution service provide a group having an indicated number of computing nodes, optionally with additional information being specified (e.g., one or more types of software programs for the program execution service to execute on those computing nodes; one or more associated fees that the provider user plans to charge clients for use of the shared computing environment; one or more types of changes to the group that the program execution service is authorized to perform, such as to replace any computing nodes that fail, to scale the group larger and/or smaller in response to an amount of client demand, etc.). In this case, the multiple computing nodes 120*b*1 provide the first shared computing environment in a distributed manner, such as by providing the same type of functionality in a replicated manner, by providing complementary but distinct functionality from other or more of the other computing nodes 120*b*1, etc. Furthermore, once the computing nodes 120*b*1 are available to the provider user 140*b*1 from the program execution service, the provider user may interact directly with those computing nodes to perform further actions, such as to load and execute additional programs, monitor performance of the first provided shared computing environment, etc.—in this manner, the provider user 140*b*1 controls various aspects of the operating performance of the first provided shared computing environment. The other provider users may perform similar actions for their provided shared computing environments. In addition, various other users 140*c* of the program execution service may also optionally interact with the program execution service to use computing nodes 120*c*, such as to provide one or more other shared computing environments and/or to use computing nodes 120*c* to provide dedicated functionality to the users 140*c*.

In this example, the first and second provided shared computing environments (using the computing nodes 120*b*1 and 120*b*2, respectively) are part of a collection 115 of multiple shared computing environments that are alternatives each providing one or more common indicated types of functionality, such as by providing the same or overlapping functionality types. In addition, various clients use computing systems 160*a* to obtain and use access to shared computing environments. In particular, in this example, the common indicated type(s) of functionality enable clients to execute client-supplied programs 205 within the shared computing environments of the collection 115, with clients 160*a*1 and 160*a*2 simultaneously executing programs A1 205-1 and A2 205-2, respectively, to access the common indicated type(s) of functionality using computing node 120*b*2 of the second shared computing environment, and with clients 160*a*1 and one or more other clients (not shown) executing (whether simultaneously or serially) programs A3 205-3 and A-N 205-N, respectively, to access the common indicated type(s) of functionality using computing nodes 120*b*1 of the first shared computing environment.

The shared computing environment manager system 125 obtains 210 various information about the shared computing environments being provided by the program execution service, including to obtain and assess performance information about operation of the shared computing environments, including the usage by particular clients 160*a* of particular shared computing environments, and optionally to obtain information about other attributes of the shared computing environments (e.g., fees charged by the provider users who operate the shared computing environments). The obtained and assessed information enables the shared computing environment manager system 125 to perform various operations, including to assist potential clients in selecting appropriate shared computing environments to use, to assist in identifying clients who may benefit from switching between alternative shared computing environments (e.g., lower fees, better performance, etc.), to assist in identifying clients who may benefit from switching from use of a shared computing environment to dedicated use of one or more computing nodes 120*c* of the program execution service, etc. In some embodiments and situations, the obtained information may further include information about other users 140*c* of the program execution service who obtain dedicated use of computing nodes 120*c*, such as to enable automated determinations of whether those users would receive benefits in switching to use of one or more shared computing environments.

In this example, potential client 160*a*4 is interesting in obtaining access to the common indicated type(s) of functionality, and interacts with the shared computing environment manager system to obtain information about any shared computing environments that satisfy a specified request of the potential client—for example, the specified request may be about access to the common indicated type(s) of functionality, optionally in combination with specified cost information (e.g., a maximum cost, a monetary bid, etc.) and/or other specified criteria (e.g., one or more types of performance information, such as maximum or minimum values with respect to one or more indicated performance metrics). The shared computing environment manager system retrieves and provides the requested information to the potential client to enable the potential client to, in this example, select one of the first and second provided shared computing environments that best satisfies the potential client's needs and desires. In some embodiments, the shared computing environment manager system may further perform additional operations, such as to select a preferred shared computing environment and to automatically initiate use of that preferred environment by the potential client (e.g., in accordance with a monetary bid submitted by the potential client).

In some embodiments, the shared computing environment manager system 125 may receive fees for some or all of the functionality that it provides, including one or more of fees from the program execution service 105 (e.g., for directing clients to shared computing environments provided by the program execution service, for directing users to switch from and/or to use of dedicated computing nodes in lieu of shared computing environments provided by the program execution service, etc.), from clients 160*a* (e.g., for providing information to use in assessing shared computing environments, including to select between alternative shared computing environments; for assisting in automatically initiating interactions between a client and a matching shared computing environment, such as in accordance with a bid submitted by the client; for directing users to switch from and/or to use of dedicated computing nodes in lieu of shared computing environments; etc.), from provider users 140*b* (e.g., for providing information to clients about their provided shared computing environments, including to automatically select their provided shared computing environment from multiple alternative shared computing environments, optionally in accordance with client-specified bids or other criteria; for providing information to the provider user about performance of his/her provided shared computing environment, optionally with respect to other alternative shared computing environments; for directing users to switch to use of his/her provided shared computing environment, such as from use of dedicated computing nodes and/or other shared computing environments; etc.), from other program execution service users 140*c* (e.g., for directing users to switch to use of a provided shared computing environment, such as from use of dedicated computing nodes), etc.

Thus, the use of the described techniques by a shared computing environment may provide various benefits in various embodiments, including to provider users, clients, and a program execution service, as discussed above and in greater detail throughout.

In addition, as noted above, a provider user who provides or is otherwise associated with a shared computing environment may in some embodiments interact with the program execution service and/or the shared computing environment manager system to configure pricing and other information for use of the shared computing environment by others, such as to specify one or more alternative or complementary configured usage models that correspond to use of the shared computing environment by a client. For example, a shared computing environment may define pricing conditions that are based on an indicated amount of use of one or more use dimensions (e.g., an indicated price for each use of the shared computing environment; an indicated price per amount of time of use; an indicated price per unit of processing time; an indicated price per unit of storage used; an indicated price per unit of data transferred in; an indicated price per unit of data transferred out; an indicated price for a predetermined number of times of use in a predetermined period of time; an indicated price per occurrence of a specified type of access or activity; etc.), such as to reflect an amount of computing resources used by the shared computing environment when executing.

Software programs that are used to provide shared computing environments may be of a variety of types in various embodiments, including, for example, programs with client-side program portions designed to execute on computing devices of client end users, server-based applications that client end users may access using remote client devices (e.g., Web applications accessed via a Web browser executing on a client device of a client end user), etc. The software programs may further include applications with a graphical user interface (e.g., desktop applications or Web applications), a command-line interface (e.g., for a system utility), and/or a programmatic interface accessed via electronic messages or other electronic interactions by other remote executing software. In addition, in some embodiments, the software programs may each be an executable software image. Such executable software images may, for example, be virtual machine images (e.g., images that are bootable or otherwise loadable by a virtual machine and that each include operating system software and/or software for one or more application programs).

In addition, a configured usage model for a particular shared computing environment may further include conditions that specify other types of criteria or other information in at least some embodiments, such as access criteria to control which other users are allowed to access that shared computing environment (e.g., to indicate that all users are allowed, to indicate particular users that are allowed and/or excluded, to indicate groups of users that are allowed and/or excluded, to indicate characteristics of users that are allowed and/or excluded, etc.) and/or to indicate other conditions under which access to that shared computing environment is allowed or not allowed (e.g., conditions related to day and/or time, such as one or more times during which the use of the shared computing environment is allowed or is disallowed; conditions related to a type of use of the shared computing environment, such as one or more types of software programs with which the use of the shared computing environment is allowed or is disallowed; conditions related to geographical locations, such as one or more geographical locations at which access to the shared computing environment is allowed or is disallowed; conditions related to types of applicable taxes or other regulatory legal schemes; etc.). Additional details related to examples of configuring usage models for use of a service are included in U.S. patent application Ser. No. 12/980,214, filed Dec. 28, 2010 and entitled "Managing Use Of Software Components," and in U.S. patent application Ser. No. 11/618,486, filed Dec. 29, 2006 and entitled "Providing Configurable Use By Applications Of Sequences Of Invocable Services," each of which is hereby incorporated by reference in its entirety.

Figure 3:
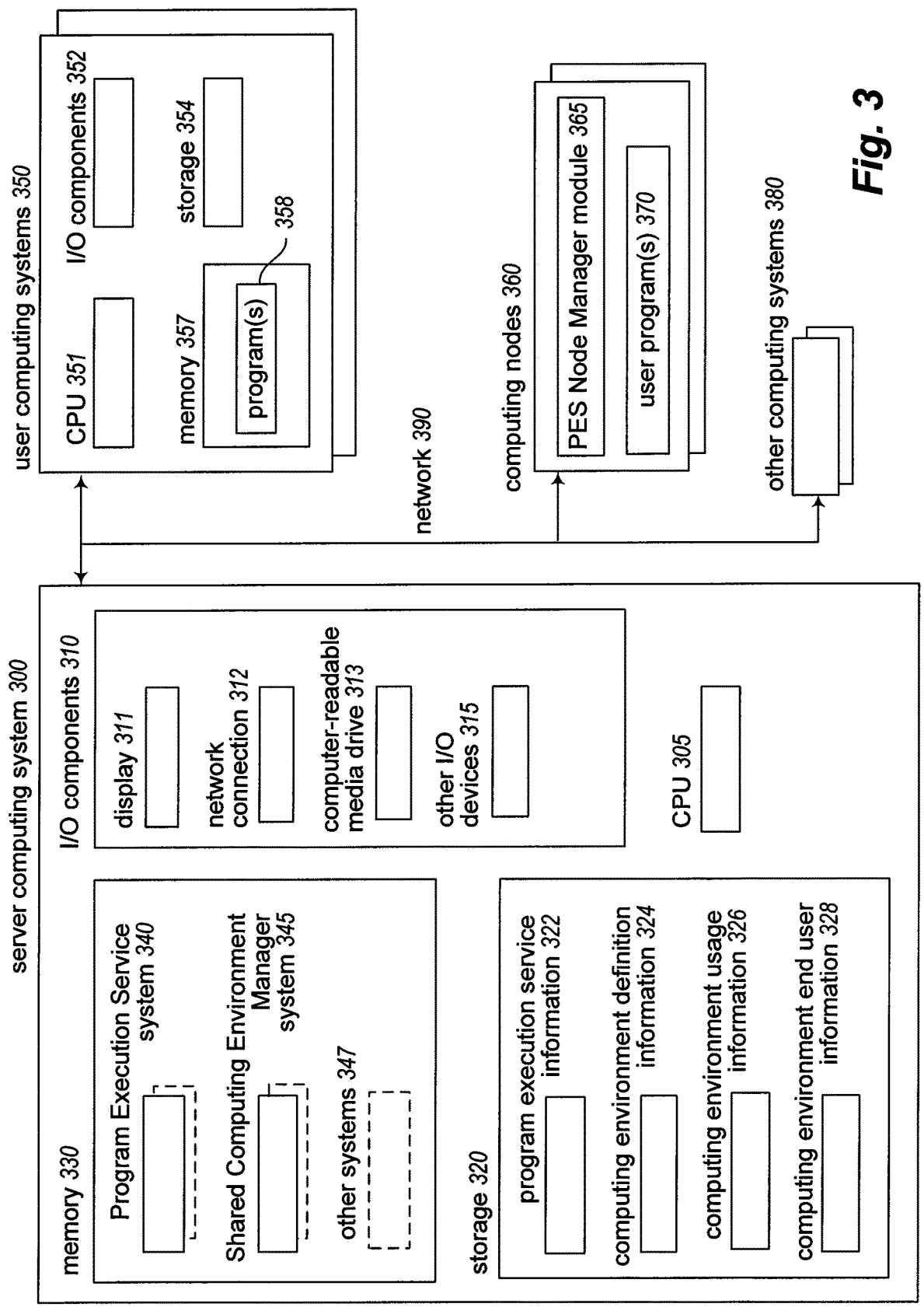
FIG. 3 is a block diagram illustrating example configured computing systems suitable for execution of an embodiment of a system that manages the providing and use of shared computing environments.

FIG. 3 is a block diagram illustrating example computing systems suitable for executing an embodiment of a system for providing a shared computing environment manager system that manages use of shared computing environments, as well as optionally a program execution service via which one or more shared computing environments are provided. In particular, FIG. 3 illustrates a server computing system 300 suitable for providing at least some functionality of a program execution service and of a shared computing environment manager system, although in other embodiments multiple computing systems may be used for the execution (e.g., to have distinct computing systems executing the program execution service and of the shared computing environment manager system). FIG. 3 also illustrates various computing systems 350 that may be used by users of the program execution service and/or of the shared computing environment manager system, computing nodes 360 that may be used by the program execution service, and other computing systems 380. In the illustrated embodiment, the server computing system 300 has components that include one or more CPU ("central processing unit") computer processors 305, various I/O ("input/output") components 310, storage 320, and memory 330. The illustrated I/O components include a display 311, a network connection 312, a computer-readable media drive 313, and other I/O devices 315 (e.g., a keyboard, a mouse, speakers, etc.), although in other embodiments the server computing system may have different components (e.g., may not have a display). In addition, the illustrated user computing systems 350 may each have components similar to those of server computing system 300, including one or more CPUs 351, I/O components 352, storage 354, and memory 357, although particular I/O components are not illustrated in this example. The other computing systems 380 and computing nodes 360 may also each include components that are similar to some or all of the components illustrated with respect to server computing system 300, but such components are not illustrated in this example for the sake of brevity.

An embodiment of one or more modules 340 of a program execution service system (e.g., a system module, such as module 110 of FIG. 1) are executing in memory 330, and in some embodiments each includes various software instructions that when executed program one or more of the CPU processors 305 to provide the described functionality. The module(s) 340 interact with computing systems 350 and 380 and computing nodes 360 over the network 390 (e.g., via the Internet and/or the World Wide Web, via a private cellular network, etc.). In this example embodiment, the module(s) 340 include functionality related to managing use of multiple computing nodes 360 by various users (not shown) interacting with user computing systems 350, such as in conjunction with a program execution service provided by the module(s) 340, including to optionally provide shared computing environments as requested by provider users of the program execution service. The other computing systems 350 and 380 and computing nodes 360 may be executing various software as part of interactions with the module(s) 340 and/or 345. For example, user computing systems 350 may be executing software in memory 357 to interact with module(s) 340 and/or 345 (e.g., as part of a Web browser or specialized client-side application program), such as to configure and/or request execution of programs on behalf of the users of those systems on one or more computing nodes 360 in various ways, as well as to perform various other types of actions, as discussed in greater detail elsewhere. In addition, each of the computing nodes may execute one or more user programs 370 (e.g., one or more programs being used by a user as part of dedicated use of the computing node, one or more programs being used by a provider user as part of providing a shared computing environment with the computing node, one or more client-supplied programs that are executed as part of a shared computing environment being provided by the computing node, etc.), as well as to optionally execute or otherwise be associated with a Node Manager module 365 of the program execution service that monitors and manages use of the computing node. Various information related to the functionality of the module(s) 340 may be stored in storage 320, such as information 322 related to configuration of, execution of and/or use of executing programs on behalf of multiple users.

After the module(s) 340 receive requests (or other indications) to execute one or more programs on a group of one or more computing nodes 360, the module(s) 340 select the one or more computing nodes for the group, and initiate execution of those programs on those computing nodes 360. In addition, the module(s) 340 may further interact with computing nodes 360 to later terminate execution of initiated programs on the computing nodes, to migrate one or more of the programs to one or more other computing nodes 360 or computing systems 380, etc. The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the module(s) 340 may interact with one or more other computing systems 380 to initiate or terminate execution of one or more programs on those computing systems, such as if the computing systems 380 are provided by one or more third-party participants who are providing computing nodes for use by other users. In some embodiments, the module(s) 340 may further or instead manage access to one or more types of computing-related resources or services other than program execution services (e.g., persistent or temporary data storage services, messaging services, database services, etc.).

In addition, the module(s) 340 includes functionality in this example related to monitoring or otherwise interacting with one or more of the computing nodes 360 to track use of those computing nodes, such as to determine performance characteristics corresponding to some or all computing nodes of a group being used to provide a shared computing environment. As previously noted, such information may be stored on storage 320 and/or elsewhere (e.g., on one or more remote storage systems, not shown), and may be used by the module(s) 340 and/or the shared computing environment manager system in various manners. For example, in some embodiments, if the module(s) 340 discover that a computing node has failed or otherwise become unavailable (e.g., as part of provisioning or otherwise initializing the computing node to be used as part of a computing node group, after the computing node has been in use as part of a computing node group, etc.), the module(s) 340 may automatically take actions to replace the unavailable computing node with a new computing node. In other embodiments, the module(s) 340 may instead not perform some or all of the monitoring of the computing nodes, such as if the module(s) 340 and/or 345 instead obtain information from another source about performance characteristics corresponding to some or all computing nodes of a computing node group (e.g., as provided by software executing on the computing nodes).

An embodiment of one or more modules 345 of a shared computing environment manager system (e.g., a system module, such as module 130 of FIG. 1) are also executing in memory 330, and in some embodiments each includes various software instructions that when executed program one or more of the CPU processors 305 to provide the described functionality. The module(s) 345 in this example interact with the program execution service provided by the module(s) 340 via the server computing system 300 (e.g., via shared memory, an internal bus, etc.), although in other embodiments the shared computing environment manager system and program execution service may instead interact via one or more intervening networks. In this example embodiment, the modules 345 include functionality related to managing the provision of shared computing environments by provider users and use of shared computing environments by client users, as discussed in greater detail elsewhere. Various information related to the functionality of the modules 345 may be stored in storage 320, such as information 324 related to the definition of shared computing environments being managed (e.g., types of indicated functionality, associated pricing terms, etc.) that is used by the modules 345, information 326 related to the use of shared computing environments being managed by clients (e.g., operational performance information for the shared computing environment, historical and current usage by particular clients, etc.) that is used by the modules 345, and information 328 related to clients who are end users of the shared computing environments (e.g., client-supplied bids, client requirements and/or preferences for use of shared computing environments, etc.) that is used by the modules 345. In other embodiments, some or all of the information 322, 324, 326 and 328 may instead be stored in other manners, such as in part or in whole on one or more remote storage systems (not shown).

As discussed in greater detail elsewhere, in some embodiments one or more modules of the shared computing environment manager system may provide functionality to users distinct from a program execution service, whether instead of or in addition to one or more program execution services. Such users may, for example, use one or more of the computing systems 350 and/or 380. In addition, one or more other optional systems 347 may execute in memory 330, such as to provide functionality for use by the program execution service system 340 and/or the shared computing environment manager system 345.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware that may interact and perform the described types of functionality, optionally when being programmed by appropriate software instructions, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules 340 and/or 345 may in some embodiments be distributed in additional modules. Similarly, in some embodiments some of the functionality of the modules 340 and/or 345 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
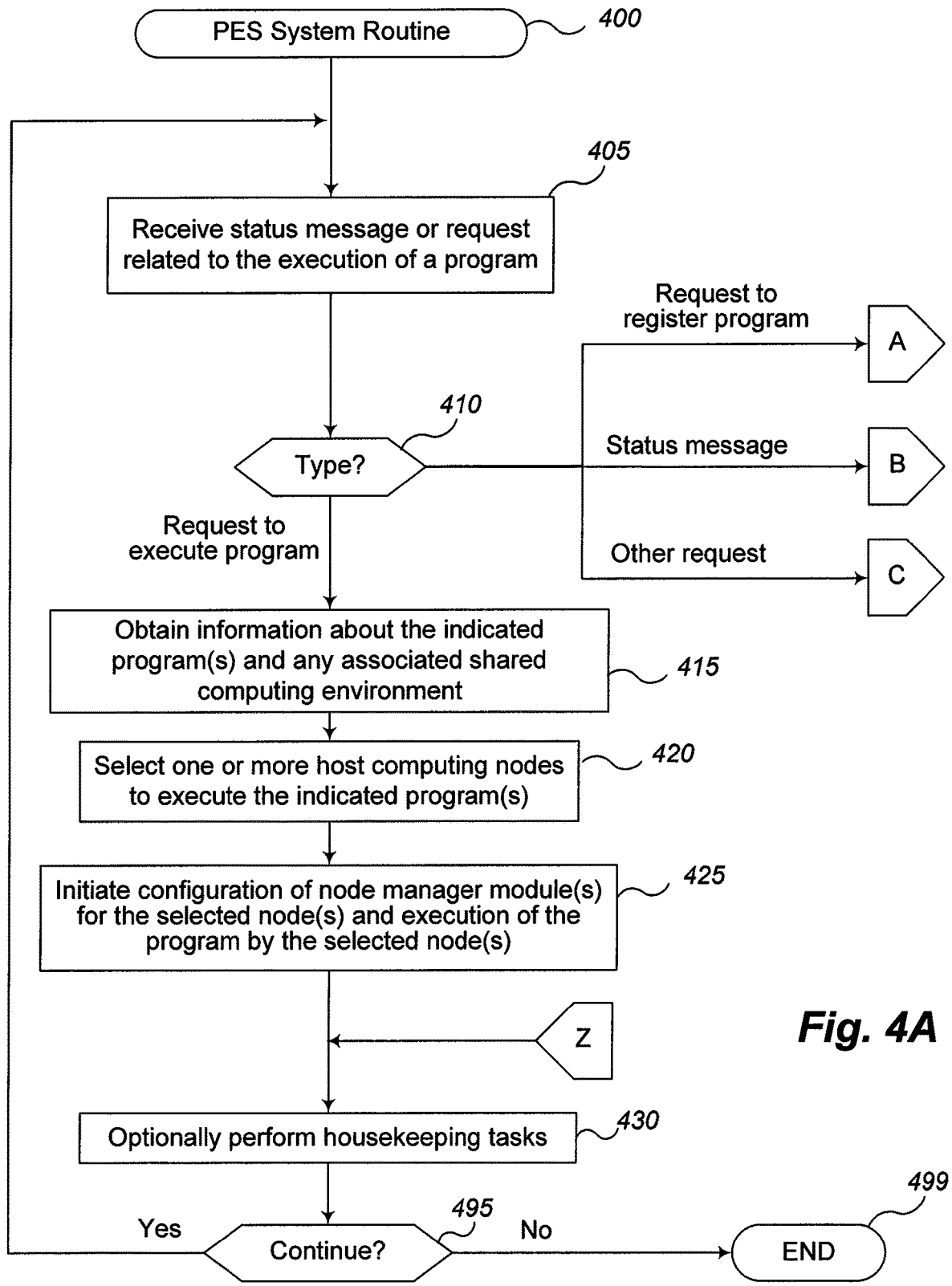
FIGS. 4A-4B are a flow diagram of an example embodiment of a PES System routine for a program execution service.
Figure 4B:
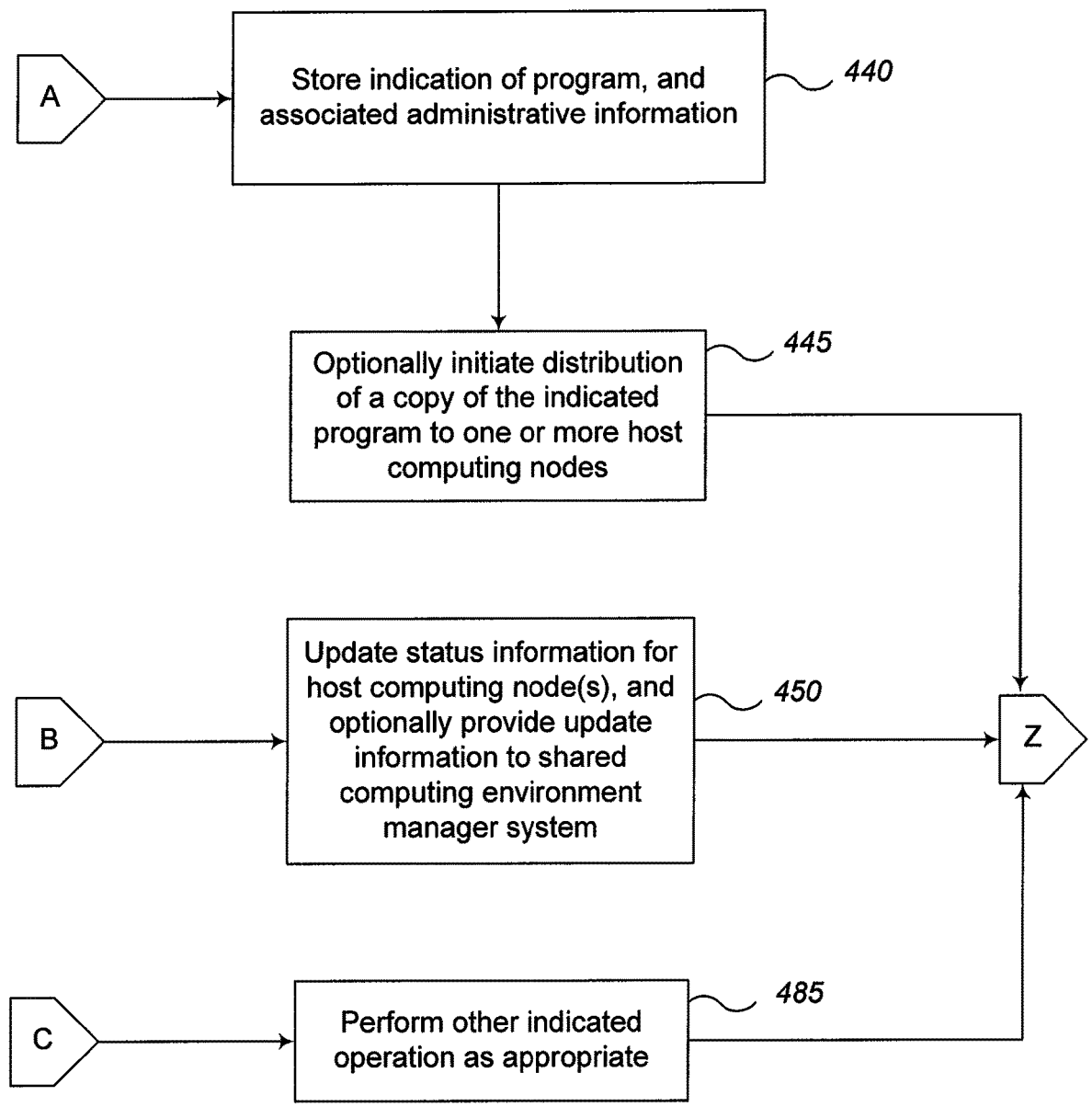

FIGS. 4A and 4B are a flow diagram of an example embodiment of a PES System routine 400. The routine may be provided by, for example, execution of a PES system module 110 of FIG. 1, of module(s) 340 of the program execution service system of FIG. 3, and/or of one or more modules of system 105 of FIG. 2.

In the illustrated embodiment, the routine begins at block 405, where a status message or other request related to the execution of a program is received. The routine continues to block 410 to determine the type of the received message or request. If it is determined in block 410 that the type is a request to execute one or more indicated software programs, such as from a user or other executing program, the routine continues to block 415 to obtain information about the indicated software program(s), as well as about an associated shared computing environment to be provided by the program execution if the request is from a provider user, including any associated usage models or fees to be charged to clients who use the provided shared computing environment. The information may be obtained in various manners, such as by being received in block 405, being retrieved from storage for a previously specified software program and/or shared computing environment, etc. After block 415, the routine continues to block 420 to select one or more host computing nodes on which to execute the indicated program, such as from a group of candidate host computing nodes available for program execution. In some embodiments, the one or more host computing nodes may be selected in accordance with user instructions or other indicated criteria of interest.

The routine then continues to block 425 to initiate configuration associated with the program execution for each of the selected host computing nodes, and to initiate execution of the program by each of the selected host computing nodes, such as by interacting with one or more Node Manager modules associated with the selected host computing nodes. The configuration may include, for example, configuring a Node Manager module that is part of a hypervisor program on each host computer system that hosts virtual machine computing nodes and for which the hosted computing nodes include one or more of the selected host computing nodes, or other type of Node Manager module in other situations. The configuration may further include taking actions for the computing node and/or the Node Manager module to initiate monitoring of a provided shared computing environment in order to provide corresponding performance operation, as described in greater detail elsewhere. In block 430, the routine then optionally performs one or more housekeeping tasks (e.g., monitoring program execution by users, such as for metering and/or other billing purposes).

If it is instead determined in block 410 that the received request is to register a new program as being available for later execution, the routine continues instead to block 440 to store an indication of the program and associated administrative information for its use (e.g., access control information related to users who are authorized to use the program and/or authorized types of uses, information about a type of functionality provided by the program if later used as part of a shared computing environment and optionally any associated usage model(s), etc.), and may further store at least one centralized copy of the program in some situations. The routine then continues to block 445 to optionally initiate distribution of copies of the indicated program to one or more host computer nodes for later use, such as to allow rapid startup of the program by those host computer nodes by retrieving the stored copy from local storage of those host computer nodes. In other embodiments, one or more copies of the indicated program may be stored in other manners, such as on one or more remote storage systems.

If it instead determined in block 410 that a status message is received in block 405 concerning one or more host computing nodes, the routine continues instead to block 450 to update information concerning those host computing nodes, such as to track usage of executing programs, usage and performance of corresponding shared computing environments being provided, and/or other status information about host computing nodes. In some embodiments, status messages are sent periodically by node manager modules, while in other embodiments, status messages may be sent at other times (e.g., whenever a relevant change occurs). In yet other embodiments, the routine 400 may instead request information from node manager modules and/or host computing nodes as desired. Status messages may include a variety of types of information, such as the number and identity of programs currently executing on a particular computing node, the number and identity of clients of shared computing environments provided by one or more computing nodes, the number and identity of copies of programs currently stored in the local program repository on a particular computing node, performance-related and resource-related information (e.g., utilization of CPU, network, disk, memory, etc.) for a computing node, configuration information for a computing node, and reports of error or failure conditions related to hardware or software for a particular computing node. In addition, if the status information corresponds to a particular shared computing environment, the routine in block 450 may further push that information to a shared computing environment manager system, or instead save that information until later requested by the shared computing environment manager system (e.g., as discussed with respect to block 485).

If the routine instead determines in block 405 that another type of request or message is received, the routine continues instead to block 485 to perform one or more other indicated operations as appropriate. Such other operations may include, for example, suspending or terminating execution of currently executing programs, dynamically updating the authorization of a particular client to use a particular shared computing environment (e.g., to add or remove authorization in particular situations, such as based on instructions from a provider of the shared computing environment after the client purchases or otherwise obtains access to the shared computing environment, or based on other actions taken by the client to change authorization of the client to use the shared computing environment), dynamically modifying the use conditions or other parts of a usage model for a specified shared computing environment, providing requested information about a shared computing environment (e.g., providing operational performance information to a shared computing environment manager system, such as status information previously received and stored with respect to block 450 and/or current status information that is dynamically retrieved in response to the request; providing historical and/or current status information to a provider user who is managing the shared computing environment; providing status information and/or administrative information to a client who is using or is considering use of the shared computing environment; etc.), and otherwise managing administrative aspects of the program execution service (registration of new users, determining and obtaining of payment for use of the program execution service and/or of particular shared computing environments, etc.). After blocks 445, 450 or 485, the routine continues to block 430 to optionally perform one or more housekeeping tasks. The routine then continues to block 495 to determine whether to continue, such as until an explicit termination instruction is received. If it is determined to continue, the routine returns to block 405, and if not continues to block 499 and ends.

While not illustrated here, in at least some embodiments, a variety of additional types of functionality to execute programs may be provided by a program execution service, such as optionally in conjunction with a shared computing environment manager system. In at least some embodiments, the execution of one or more copies or instances of a program on one or more computer systems may be initiated in response to a current execution request for immediate execution of those program instances. Alternatively, the initiation may be based on a previously received program execution request that scheduled or otherwise reserved the then-future execution of those program instances for the now-current time. Program execution requests may be received in various ways, such as directly from a user (e.g., via an interactive console or other GUI provided by the program execution service), or from an executing program of a user that automatically initiates the execution of one or more instances of other programs or of itself (e.g., via an API provided by the program execution service, such as an API that uses Web services). Program execution requests may include various information to be used in the initiation of the execution of one or more instances of a program, such as an indication of a program that was previously registered or otherwise supplied for future execution, and a number of instances of the program that are to be executed simultaneously (e.g., expressed as a single desired number of instances, as a minimum and maximum number of desired instances, etc.). In addition, in some embodiments, program execution requests may include various other types of information, such as the following: an indication of a user account or other indication of a previously registered user (e.g., for use in identifying a previously stored program and/or in determining whether the requested program instance execution is authorized); an indication of a payment source for use in providing payment to the program execution service for the program instance execution; an indication of a prior payment or other authorization for the program instance execution (e.g., a previously purchased subscription valid for an amount of time, for a number of program execution instances, for an amount of resource utilization, etc.); and/or an executable or other copy of a program to be executed immediately and/or stored for later execution. In addition, in some embodiments, program execution requests may further include a variety of other types of preferences and/or requirements for execution of one or more program instances. Such preferences and/or requirements may include indications that some or all of the program instances be executed in an indicated geographical and/or logical location, such as in one of multiple data centers that house multiple computing systems available for use, on multiple computing systems that are proximate to each other, and/or on one or more computing system that are proximate to computing systems having other indicated characteristics.

FIG. 5 is a flow diagram of an example embodiment of a Node Manager routine 500. The routine may be provided by, for example, execution of a Node Manager module 365 of FIG. 3, and/or of a node manager module (not shown) of the program execution service system 105 of FIGS. 1 and 2, such as to manage execution of programs on computing nodes, including computing nodes that are used to provide shared computing environments. In the illustrated embodiment, the program execution service provides functionality through a combination of one or more system modules and multiple node manager modules and optionally one or more other modules, although in other embodiments other configurations may be used (e.g., multiple node manager modules executing together in a coordinated manager without a separate system module, etc.). In addition, in the illustrated embodiment, some or all of the computing nodes used by the program execution service may be virtual machine computing nodes hosted by physical computer systems, and if so the node manager routine may execute as part of a hypervisor program on such a physical computer system, although in other embodiments other types of computing nodes and/or node manager module locations may be used.

The illustrated embodiment of the routine begins in block 505, where a request is received related to program execution on an associated computing node—the request may be directed to the node manager module, or instead to a particular computing node that is associated with the node manager module. The routine continues to block 510 to determine whether the request is related to executing one or more indicated programs on an indicated associated computing node, such as a request from a program execution service (e.g., with respect to block 425 of routine 400), directly from a user to whom the associated computing node provides dedicated functionality, from a client user accessing a computing node that is part of a group of one or more computing nodes providing a shared computing environment on behalf of a provider user, etc. If so, the routine continues to block 515 to obtain a copy of the indicated program(s), such as by receiving a program copy as part of the request in block 505 (e.g., a client-supplied program), by retrieving a copy from local or non-local storage (e.g., from a remote storage service), etc. The routine then continues to block 530 to initiate execution of the program(s) on an associated computing node. In some embodiments, the routine may further determine authorization of the user to execute the program (e.g., for a client attempting to access a shared computing environment), such as based on supplied information and/or by interacting with a system module of the program execution service or a remote computing system of an associated provider user, including to optionally configure the node manager module about determined authorization of the user to use particular features of the shared computing environment.

If it is instead determined in block 510 that the received request is not to execute one or more indicated programs, the routine continues instead to block 540 to determine whether a request is received to access a shared computing environment in manners other than executing a client-supplied program, such as to obtain content, to provide client-supplied data to be processed, etc. If so, the routine continues to block 545 to identify one or more corresponding associated computing nodes that have executing software providing the shared computing environment, and optionally to verify authorization of the client user request (e.g., in a manner similar to that previously discussed above). In block 550, the routine then forwards the client user request to the identified computing node(s) if authorized. Any subsequent response from the shared computing environment to the client user request is provided directly to the client user (e.g., to one or more computing devices of the client user) in this example without being reviewed and optionally authorized by the node manager module, although in other embodiments such responses may be handled in other manners.

If it is instead determined in block 540 that the received request of block 505 is not a client user request for a shared computing environment, the routine continues instead to block 560 to determine whether to provide status information about one or more associated computing nodes, such as in response to a request or instead as is triggered in another manner (e.g., periodically, based on occurrence of a triggering event, etc.). If a request is received, it may, for example, be from a system module of the program execution service and/or a shared computing environment manager system for information about a shared computing environment being provided by the one or more associated computing nodes. If it is so determined in block 560, the routine continues to block 565 to obtain the requested status information and to provide it as appropriate, such as to the computing environment manager system and/or to another requester. The status information may be obtained in various manners, such as by retrieving stored information that was previously generated and/or by dynamically obtaining current status information from the one or more associated computing nodes. As discussed in greater detail elsewhere, such status information may be of various types in various embodiments.

If it is instead determined in block 560 that status information is not to be provided, the routine continues instead to block 585 to perform one or more other indicated operations as appropriate. The other operations may have various forms in various embodiments, such as receiving and responding to information or requests from an associated computing node or other systems. For example, in some embodiments and situations, various types of messages may be received from one or more associated computing nodes that are providing a shared computing environment—such messages may, for example, include a status message from a shared computing environment (e.g., to indicate that the shared computing environment is currently in use by one or more clients or not currently in use, has received a request or other attempt to obtain access to one or more types of functionality, etc.), such as on a periodic basis or in response to an event of interest, or may include information based on interactions that a client user has initiated with the shared computing environment to obtain access to features for which the user does not already have use authorization (e.g., all features, such as if the user does not initially have use authorization for any features of the shared computing environment; one or more particular features, such as for premium features; etc.). In addition, while not illustrated here, the routine 500 may further perform one or more other actions of a hypervisor in at least some embodiments, such as if the node manager module is executed as part of a hypervisor.

After blocks 530, 550, 565, or 585, the routine continues to block 595 to determine whether to continue, such as until an explicit termination instruction is received. If it is determined to continue, the routine returns to block 505, and if not continues to block 599 and ends.

In addition, for at least some types of requests, the routine may in some embodiments further verify that the requester is authorized to make the request in one or more additional manners, such as based on access rights specified for the requester and/or an associated target of the request (e.g., an indicated user or shared computing environment). In some such embodiments, the verification of authorization may further include obtaining payment from the requester for the requested functionality (or verifying that any such payment has already been provided), such as for requests from client users to use a shared computing environment, including to optionally not perform the request if the payment is not provided. For example, types of request that may have associated payment in at least some embodiments and situations include requests to execute client-supplied programs or other indicated programs within an indicated shared computing environment, or to otherwise obtain access to some or all features of an indicated shared computing environment. Furthermore, some or all types of actions taken on behalf of users may be monitored and metered, such as for later use in determining corresponding usage-based fees for at least some of those actions.

Figure 6:
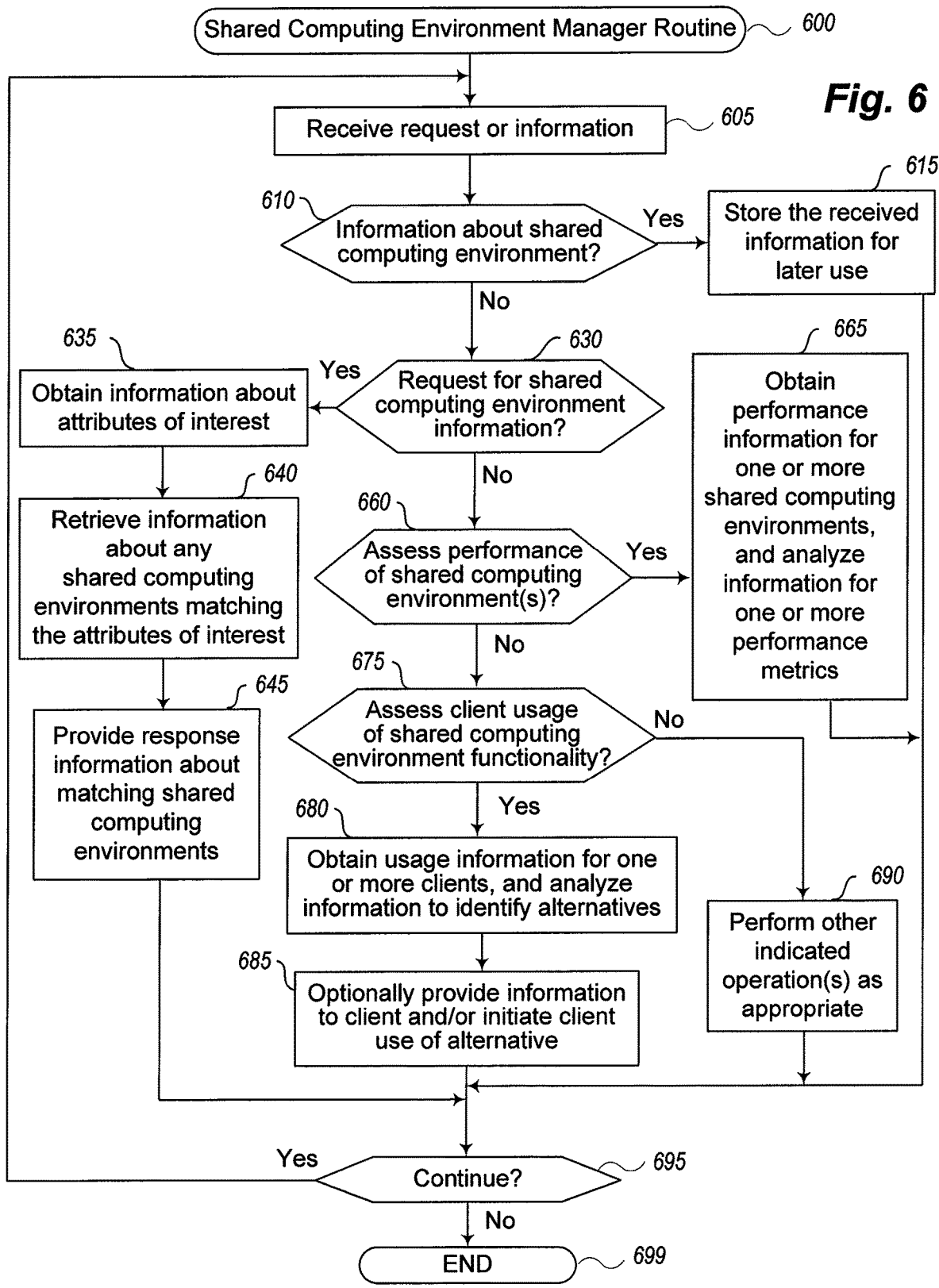
FIG. 6 is a flow diagram of an example embodiment of a Shared Computing Environment Manager routine.

FIG. 6 is a flow diagram of an example embodiment of a Shared Computing Environment Manager routine 600. The routine may be provided by, for example, execution of the shared computing environment manager system module 130 of FIG. 1, of module(s) 345 of the shared computing environment system of FIG. 3, and/or of one or more modules of system 125 of FIG. 2.

The illustrated embodiment of the routine begins at block 605, where the routine receives a request or information. The routine then continues to block 610 to determine if information was received in block 605 about one or more shared computing environments, and if so continues to block 615 to store the received information for later analysis or other use. The information may be received in various manners, such as information supplied by a provider user about a new shared computing environment being made available, performance information supplied by a program execution service or its modules about ongoing operation of one or more shared computing environments made available via the program execution service (whether information that is pushed to routine 600 by the program execution service, or that is supplied in response to a prior request from the routine 600 for such information, such as with respect to block 690); etc.

If it is instead determined in block 610 that information was not received in block 605 about one or more shared computing environments, the routine continues instead to block 630 to determine if a request is received in block 605 for information about one or more shared computing environments, such as from a client or potential client of a shared computing environment. If so, the routine continues to block 635 to obtain information about the shared computing environment(s) of interest, such as from information received in block 605 and/or by performing interactive or automated interactions with the client or other requester. The obtained information may include, for example, one or more of an identification of a particular shared computing environment (e.g., a unique identifier, such as a name or an identification of a provider user who provides only a single shared computing environment), or otherwise information about one or more attributes desired in a shared computing environment (e.g., one or more indicated types of functionality, such as may be provided by one or more indicated types of programs that are part of the shared computing environment; fees or other pricing, such as a maximum or a range or a minimum or an exact price; one or more types of criteria for performance information, such as with respect to one or more defined performance metrics, including a preferred or required maximum, range, minimum or exact value; etc.). The attribute information may be specified in various manners, such as by the client or other requester using a GUI (graphical user interface) provided by the shared computing environment manager system that enables the requester to identify particular performance metrics, particular indicated types of functionality (optionally based on particular programs being executed as part of shared computing environments), particular types of fees charged or other pricing information, categories or other groupings of shared computing environments, etc., or by otherwise specifying one or more such types of information. In at least some embodiments, the potential client or other requester may specify a monetary bid, optionally with one or more additional criteria, and the routine 600 will proceed to identify a preferred one of any matching shared computing environments (whether based on stored information about fees associated with shared computing environments and/or by dynamically contacting one or more possible shared computing environments to determine those shared computing environments are willing to accept the bid, such as for automated response by those shared computing environments and/or by manual response from provider users operating those shared computing environments), as well as to optionally proceed to automatically direct the requester to being using the preferred one shared computing environment or otherwise automatically initiate interactions between the requester and preferred one shared computing environment.

After block 635, the routine continues to block 640 to retrieve information about zero or more shared computing environments that match the request (e.g., that match any required attributes), and optionally ranks multiple alternative matching shared computing environments relative to one or more defined measures (e.g., any required or preferred attributes specified by the requester, associated cost of use, associated performance information, etc.)—the retrieved information may include, for example, previously received information (e.g., information stored with respect to block 615), previously assessed information (e.g., information assessed and stored with respect to block 665), and/or information that is dynamically retrieved for the shared computing environment(s) (e.g., from one or more program execution services via which the shared computing environments are provided, or otherwise from one or more sources of the shared computing environments). The routine then continues to block 645 to provide response information about any matching shared computing environments, such as to identify only a single preferred shared computing environment, to identify multiple alternative shared computing environments (optionally with ranking information), etc. By providing information about one or more matching shared computing environments to the requester, the routine enables the requester to select and use a particular desired shared computing environment, thus rewarding shared computing environments over time that have costs and/or performance information preferable to other alternatives. As previously noted, in some embodiments the routine may further perform operations to automatically initiate interactions between the requester and a matching shared computing environment, including in situations in which the requester has made a corresponding monetary bid that is satisfied by that matching shared computing environment.

If it is instead determined in block 630 that a request was not received in block 605 for information one or more shared computing environments, the routine continues instead to block 660 to determine if a request or instruction is received in block 605 to assess performance information about one or more shared computing environments, such as on a periodic basis or as otherwise may be triggered. If so, the routine continues to block 665 to obtain information about one or more shared computing environments of interest, such as for particular shared computing environment(s) that are identified in the request or instruction and/or for all shared computing environments matching one or more specified criteria of interest (e.g., based on an amount of time since last assessing performance information for the shared computing environment), and to analyze the obtained information with respect to one or more performance metrics of interest (e.g., for one or more predefined performance metrics assessed for all shared computing environments providing some or all indicated types of functionality, for particular performance metrics that are identified in the request or instruction, etc.). The obtained information may include, for example, one or more of previously received information (e.g., information stored with respect to block 615) and/or information that is dynamically retrieved for the shared computing environment(s) (e.g., from one or more program execution services via which the shared computing environments are provided, or otherwise from one or more sources of the shared computing environments). The performance metrics may be of various types, as discussed in greater detail elsewhere, and the analysis may include, for example, aggregating information about the use of a shared computing environment for multiple clients at multiple times. The assessed information is then stored for later use, including with respect to blocks 640 and/or 680.

If it is instead determined in block 660 that a request or instructions was not received in block 605 to assess performance information about one or more shared computing environments, the routine continues instead to block 675 to determine if a request or instruction is received in block 605 to assess usage of shared computing environment(s) by one or more clients, such as on a periodic basis or as otherwise may be triggered (e.g., based on a request from the client). If so, the routine continues to block 680 to obtain information about prior usage of one or more clients of interest of one or more shared computing environments, such as for particular client(s) that are identified in the request or instruction and/or for all clients matching one or more specified criteria of interest (e.g., based on an amount of time since last assessing usage information for the client), and to analyze the obtained information with respect to one or more assessment measures of interest (e.g., for one or more predefined measures assessed for all clients, for particular measures that are identified in the request or instruction, etc.). The obtained information may include, for example, one or more of previously received information (e.g., information stored with respect to block 615) and/or information that is dynamically retrieved for the client(s) from one or more shared computing environments (e.g., from one or more program execution services via which the shared computing environments are provided, or otherwise from one or more sources of the shared computing environments). In some situations, the obtained information may further include information supplied by the client(s) of interest, whether previously (e.g., as part of the information received in block 605) or in response to dynamic interactions with the client(s). The assessment measures may be of various types, as discussed in greater detail elsewhere, including to assess the fees paid by a client and/or performance received by the client with respect to one or more performance metrics, including in comparison to other alternatives (e.g., other shared computing environments, dedicated use of one or more computing nodes from a program execution service, etc.). In addition, the analysis may include, for example, aggregating information about the use of one or more shared computing environments for a client at multiple times, and in some cases may include assessing use by a potential client of functionality directly from a program execution service in order to identify alternatives that include one or more shared computing environments. The routine then continues to block 685 where the assessed information is then used in one or more manners, such as to optionally provide information to the client(s) of interest, to store the information for later use (including with respect to block 640), and/or to automatically initiate the performance of one or more actions related to use of shared computing environments. The automatically initiated actions may include, for example, moving the client between use of a shared computing environment and one or more dedicated computing nodes of a program execution service (e.g., to minimize associated costs and/or to improve performance being provided to the client), moving the client from use of a first shared computing environment to a second alternative shared computing environment that also provides one or more types of functionality being used by the client (e.g., to minimize associated costs and/or to improve performance being provided to the client), etc.

If it is instead determined in block 675 that a request or instructions was not received in block 605 to assess usage of shared computing environment(s) by one or more clients, the routine continues instead to block 690 to perform one or more other indicated types of operations if appropriate. Such other operations may include, for example, making requests to obtain information about clients and/or shared computing environments (e.g., from the clients, from the program execution service(s) or other sources that provide the shared computing environments, etc.), performing interactions with shared computing environments as clients to obtain performance information, interacting with one or more affiliated program execution services to otherwise enhance functionality provided by those program execution services (e.g., to identify users of dedicated computing nodes of the program execution services who would benefit from use of a shared computing environment), etc.

After blocks 615, 645, 665, 685 or 690, the routine continues to block 695 to determine whether to continue, such as until an explicit indication to terminate is received. If it is determined to continue, the routine returns to block 605, and if not continues to block 699 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   receiving, by a program execution service that is being provided by one or more programmed computing systems and that has multiple users, instructions from a first user of the multiple users to execute one or more indicated software programs to provide an indicated type of functionality in a first shared computing environment of the first user that is available for use by other users of the multiple users;
   provisioning, by the program execution service and on behalf of the first user, a first host computing node to execute the one or more indicated software programs for the first user, wherein the first host computing node is a virtual machine that is selected from a plurality of computing nodes provided by the program execution service for use by the multiple users and that is hosted by a server computing system of the program execution service;
   executing, by the program execution service and on behalf of the first user, the indicated one or more software programs on the first host computing node, including providing the first shared computing environment for the first user; and
   while the providing of the first shared computing environment on the first host computing node for the first user continues,
      receiving, by the program execution service and from an additional user of the multiple users that is separate from the first user, a request to execute an additional program using the indicated type of functionality;
      selecting, by the program execution service and based at least in part on one or more specified criteria, to execute the additional program for the additional user on the first host computing node as part of the first shared computing environment; and
      executing, by the program execution service and based at least in part on the selecting, the additional program on the first host computing node, and accessing, under control of the executing additional program, the indicated type of functionality from the first shared computing environment of the first user.

2. The method of claim 1 further comprising providing a second shared computing environment for a second user of the multiple users by executing the indicated one or more software programs on one or more second host computing nodes of the plurality, wherein the first and second shared computing environments are alternatives for the indicated type of functionality, and wherein the selecting to execute the additional program for the additional user on the first host computing node as part of the first shared computing environment includes selecting the first shared computing environment as being preferred relative to the second shared computing environment.

3. The method of claim 2 further comprising obtaining performance information related to operation of the first shared computing environment and to operation of the second shared computing environment, and wherein the selecting of the first shared computing environment as being preferred is based at least in part on the obtained performance information.

4. The method of claim 2 wherein the request received from the additional user includes the one or more specified criteria, and wherein the selecting of the first shared computing environment as being preferred is based at least in part on the specified one or more criteria.

5. The method of claim 2 wherein the request received from the additional user indicates a specified type of database management software that provides the indicated type of functionality, wherein the one or more indicated software programs include the specified type of database management software, and wherein the accessing of the indicated type of functionality from the first shared computing environment of the first user on the first host computing node includes accessing, by the executing additional program, database functionality from the executing database management software of the first user.

6. The method of claim 2 further comprising automatically directing one or more other users to interact with the second shared computing environment to obtain access to the indicated type of functionality as clients of the second shared computing environment.

7. The method of claim 1 further comprising, after the executing of the additional program on the first host computing node, determining, by the program execution service, to switch the executing of the additional program for the additional user from the first host computing node to one or more other computing nodes of the plurality to provide the indicated type of functionality to the additional user on a dedicated basis, and executing the additional program on the one or more other computing nodes based at least in part on the determining to switch.

8. The method of claim 1 further comprising, by the first host computing node:
   executing the indicated one or more software programs for the first user and providing the indicated type of functionality from the first shared computing environment of the first user; and
   executing the additional program for the additional user, including using the provided indicated type of functionality from the first shared computing environment of the first user.

9. The method of claim 1 wherein the indicated type of functionality is evaluating programs as part of an indicated software execution environment, the programs being specified in at least one of an indicated scripting language or an indicated programming language.

10. The method of claim 1 wherein the executing of the indicated one or more software programs on the first host computing node on behalf of the first user includes executing a scripting language software system for the first user, and wherein the executing of the additional program on the first host computing node includes executing the additional program as a script within the executing scripting language software system of the first user.

11. The method of claim 1 wherein the executing of the indicated one or more software programs on the first host computing node includes executing the indicated one or more software programs on each of multiple hosted virtual machines, the first shared computing environment being provided by the multiple hosted virtual machines in a distributed manner, and wherein the method further comprises executing further programs of multiple additional users on the multiple hosted virtual machines to simultaneously access the first shared computing environment and each obtain a fractional share of computing capabilities provided by the first shared computing environment while obtaining the indicated type of functionality.

12. A non-transitory computer-readable medium having stored contents including executable software instructions that, when executed by a computing system, program the computing system to perform a method, the method comprising:
   receiving, by a program execution service that is being provided at least in part by the programmed computing system and that has multiple users, instructions from a first user of the multiple users to execute one or more indicated software programs to provide a first computing environment that include an indicated type of functionality and that is available for use by other users of the multiple users;
   selecting, by the program execution service, a first host computing node from a plurality of computing nodes that are provided by the program execution service for use by the multiple users, and provisioning the first host computing node to execute the one or more indicated software programs for the first user, wherein the first host computing node is a virtual machine hosted by a server computing system of the program execution service;
   providing, by the program execution service, the first computing environment for the first user by executing the indicated one or more software programs on the first host computing node; and
   while the providing of the first computing environment on the first host computing node for the first user continues,
      receiving, by the program execution service and from an additional user of the multiple users, a request to execute an additional program for the additional user using the indicated type of functionality;
      determining, by the program execution service and based on one or more specified criteria, to execute the additional program for the additional user on the first host computing node as part of the first computing environment instead of on a separate second host computing node of the plurality without any other programs of any other users; and
      executing, by the program execution service and based at least in part on the determining, the additional program on the first host computing node, and accessing, by the executing additional program, the indicated type of functionality from the first computing environment of the first user on the first host computing node.

13. The non-transitory computer-readable medium of claim 12 wherein the method further comprises providing a second computing environment for a second user of the multiple users by executing the indicated one or more software programs on one or more second host computing nodes of the plurality, wherein the first and second shared computing environments are alternatives for the indicated type of functionality, and wherein the determining to execute the additional program for the additional user on the first host computing node as part of the first computing environment includes selecting, by the program execution service, the first computing environment as being preferred relative to the second computing environment.

14. The non-transitory computer-readable medium of claim 13 wherein the method further comprises, by the first host computing node:
   executing the indicated one or more software programs for the first user and providing the indicated type of functionality from the first computing environment of the first user; and
   executing the additional program for the additional user, including using the provided indicated type of functionality from the first computing environment of the first user.

15. The non-transitory computer-readable medium of claim 13 wherein the selecting of the first computing environment as being preferred is based on obtained performance information related to operation of the first computing environment and to operation of the second computing environment.

16. The non-transitory computer-readable medium of claim 12 wherein the method further comprises determining, by the program execution service, to switch the executing of the additional program for the additional user from the first computing environment on the first host computing node to one or more other computing nodes of the plurality to provide the indicated type of functionality to the additional user on a dedicated basis, and executing the additional program on the one or more other computing nodes based at least in part on the determining to switch.

17. The non-transitory computer-readable medium of claim 12 wherein the executing of the indicated one or more software programs on the first host computing node includes executing the indicated one or more software programs on each of multiple first host computing nodes, the first computing environment being provided by the multiple first host computing nodes in a distributed manner.

18. A system comprising:
   one or more processors of one or more computer systems; and
   one or more memories including software instructions that, when executed by at least one of the one or more processors, configure the at least one processor to provide functionality of a program execution service having multiple users, including:
      receiving instructions sent to the program execution service from a first user of the multiple users to execute one or more indicated software programs for use in providing a first shared computing environment of the first user that is available for use by other users of the multiple users;
      selecting, by the program execution service and for use in responding to the instructions from the first user, a first host computing node from a plurality of computing nodes that are provided by the program execution service for use by the multiple users;

executing, by the program execution service and on behalf of the first user, the indicated one or more software programs on the first host computing node to provide the first shared computing environment for the first user; and while the providing of the first shared computing environment on the first host computing node for the first user continues, receiving, by the program execution service and from an additional user of the multiple users that is separate from the first user, a request to execute an additional program for the additional user using an indicated type of functionality that is available from the first shared computing environment;

determining, by the program execution service and based on one or more specified criteria, whether to execute the additional program for the additional user on the first host computing node as part of the first shared computing environment or instead on a separate second host computing node of the plurality without any other programs of any other users;

selecting, by the program execution service and based at least in part on the determining, to execute the additional program on the first host computing node as part of the first shared computing environment; and executing, by the program execution service, the additional program on the first host computing node, and accessing, under control of the executing additional program, the indicated type of functionality from the first shared computing environment of the first user on the first host computing node.

19. The system of claim 18 wherein the providing of the functionality of the program execution service further includes providing a second shared computing environment for a second user of the multiple users by executing the indicated one or more software programs on one or more second host computing nodes of the plurality, wherein the first and second shared computing environments are alternatives for the indicated type of functionality, and wherein the selecting to execute the additional program on the first host computing node as part of the first shared computing environment further includes selecting the first shared computing environment as being preferred relative to the second shared computing environment.

20. The system of claim 18 wherein the executing of the indicated one or more software programs on the first host computing node on behalf of the first user includes executing a database management software system for the first user, and wherein the accessing of the indicated type of functionality from the first shared computing environment of the first user on the first host computing node includes accessing, by the executing additional program, database functionality from the executing database management software system of the first user.

21. The system of claim 19 wherein the providing of the functionality of the program execution service further includes monitoring performance of the first shared computing environment and of the second shared computing environment, and wherein the selecting of the first shared computing environment as being preferred is based at least in part on performance information obtained from the monitoring.

22. The system of claim 18 wherein the providing of the functionality of the program execution service further includes, after the executing of the additional program on the first host computing node, automatically determining, by the program execution service, to switch the executing of the additional program for the additional user from the first host computing node to the separate second host computing node to provide the indicated type of functionality to the additional user on a dedicated basis without any other programs of any other users, and executing the additional program on the second host computing node based at least in part on the automatic determining to switch.

23. The system of claim 18 wherein the executing of the indicated one or more software programs on the first host computing node on behalf of the first user includes executing a scripting language software system for the first user, and wherein the executing of the additional program on the first host computing node includes executing the additional program as a script within the executing scripting language software system of the first user.

24. The system of claim 18 wherein the executing of the indicated one or more software programs on the first host computing node on behalf of the first user includes executing for the first user an application framework software system that supports one or more programming languages, and wherein the executing of the additional program on the first host computing node includes executing the additional program using at least one of the supported one or more programming languages within the executing application framework software system of the first user.

25. The system of claim 18 wherein the executing of the indicated one or more software programs on the first host computing node on behalf of the first user includes executing for the first user a Web server software system, and wherein the executing of the additional program on the first host computing node includes executing the additional program within the executing Web server software system of the first user.

* * * * *